(12) United States Patent
Wojcicki

(10) Patent No.: US 9,511,523 B2
(45) Date of Patent: Dec. 6, 2016

(54) STATIC-DISSIPATIVE FOAM EXTRUSION CALIBRATION WITH MINIMIZED EXPANSION LOSS

(75) Inventor: Craig Wojcicki, Pittsfield, MA (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 751 days.

(21) Appl. No.: 13/433,027

(22) Filed: Mar. 28, 2012

(65) Prior Publication Data
US 2013/0259968 A1 Oct. 3, 2013

(51) Int. Cl.
*B29C 70/88* (2006.01)
*B29C 44/60* (2006.01)
*B28B 17/00* (2006.01)
*B29C 44/00* (2006.01)
*B29C 47/90* (2006.01)

(52) U.S. Cl.
CPC .......... *B29C 44/605* (2013.01); *B29C 47/90* (2013.01); *B29C 47/903* (2013.01); *B29C 67/22* (2013.01); *B29C 67/223* (2013.01); *B29C 67/224* (2013.01); *B29C 67/2235* (2013.01); *B29K 2827/12* (2013.01); *B29K 2827/18* (2013.01); *B29K 2995/001* (2013.01); *Y10S 425/055* (2013.01)

(58) Field of Classification Search
CPC ... B29C 44/605; B29C 47/90; B29C 47/903; B29C 67/22; B29C 67/223; B29C 67/2235; B29C 67/224; Y10S 425/055; B29K 2827/12; B29K 2827/18; B29K 2995/001
USPC .... 425/4 C, 817 C, 117, 128, 141, 394, 395, 425/404, 445
See application file for complete search history.

(56) References Cited

U.S. PATENT DOCUMENTS

| | | | |
|---|---|---|---|
| 3,797,981 A * | 3/1974 | Van Dijk | 425/110 |
| 4,146,563 A | 3/1979 | Ratafia et al. | |
| 4,324,748 A | 4/1982 | Hatakeyama et al. | |
| 4,491,553 A | 1/1985 | Yamada et al. | |
| 5,149,721 A | 9/1992 | Ishikawa et al. | |
| 5,229,139 A * | 7/1993 | Haupt | 425/107 |
| 5,288,218 A * | 2/1994 | Melkonian | 425/71 |
| 5,324,579 A * | 6/1994 | Sassa et al. | 442/324 |
| 5,399,307 A * | 3/1995 | Dalton et al. | 264/113 |
| 5,554,236 A | 9/1996 | Singles et al. | |
| 5,585,119 A * | 12/1996 | Petersen et al. | 425/4 C |
| 5,670,102 A | 9/1997 | Perman et al. | |
| 5,885,494 A | 3/1999 | Venkataraman et al. | |

(Continued)

FOREIGN PATENT DOCUMENTS

| | | |
|---|---|---|
| CN | 1392138 A | 1/2003 |
| EP | 856550 | 8/1998 |

(Continued)

*Primary Examiner* — Seyed Masoud Malekzadeh
(74) *Attorney, Agent, or Firm* — Cantor Colburn LLP

(57) ABSTRACT

The disclosure relates to a calibrator including a first plate opposing a second plate, the first plate having a first foam-expansion surface adjacent to a first anti-static surface, the second plate having a second foam-expansion surface adjacent to a second anti-static surface, wherein the first foam-expansion surface and the second foam-expansion surface are aligned to form a foam-expansion region, and wherein the first anti-static surface and the second anti-static surface are aligned to form an anti-static region. The disclosure also relates to a method of producing a polyetherimide foam, the method including passing a liquid polymer mixture comprising a polyetherimide through the calibrator.

16 Claims, 7 Drawing Sheets

(56) References Cited

U.S. PATENT DOCUMENTS

| | | |
|---|---|---|
| 5,886,090 A | 3/1999 | Yamana et al. |
| 5,904,978 A | 5/1999 | Hanrahan et al. |
| 6,200,119 B1 * | 3/2001 | Pelto et al. .................. 425/71 |
| 7,118,362 B2 * | 10/2006 | Lee et al. .................. 425/4 R |
| 7,648,542 B1 | 1/2010 | Hunter |
| 2002/0190426 A1 | 12/2002 | Seidner et al. |
| 2004/0198875 A1 | 10/2004 | Kaprinidis et al. |
| 2007/0123634 A1 | 5/2007 | Chung et al. |
| 2009/0152759 A1 * | 6/2009 | Malone et al. .......... 264/177.16 |
| 2009/0163609 A1 | 6/2009 | Lassor et al. |
| 2010/0072651 A1 * | 3/2010 | Wirth et al. ................ 264/51 |
| 2010/0239845 A1 | 9/2010 | Maekawa et al. |
| 2011/0155945 A1 | 6/2011 | Soong |
| 2011/0272112 A1 * | 11/2011 | Aberg et al. ............... 162/289 |

FOREIGN PATENT DOCUMENTS

| | | |
|---|---|---|
| EP | 0925900 | 6/1999 |
| EP | 858884 | 8/1999 |
| EP | 978529 | 2/2000 |
| JP | 2000086891 | 3/2000 |
| JP | 2006224628 | 8/2006 |

* cited by examiner

STATIC-DISSIPATIVE FOAM EXTRUSION CALIBRATION WITH MINIMIZED EXPANSION LOSS

BACKGROUND OF THE INVENTION

Static accumulation during calibration of extruded thermoplastic foam board is common, and the discharge of this static can often lead to localized fires, particularly when using flammable blowing agents to expand the foam. Combustion of the blowing agent is a significant process upset and is also undesirable from many safety and operational perspectives.

Static dissipative measures could be attempted, including non-contact devices such as air ionizers, but such measures have limited effectiveness based on access to the board being restricted by the calibrator itself. Physical measures may also be deployed, but the board changes geometry and dimension during startup, so it is difficult to maintain contact with the foam without the foam damaging mechanical devices.

There has been a long felt need for the invention, in part, because the use of systems that do not provide the desired lubricity and static dissipation properties has resulted in manufacturing processes that are inefficient and that are prone to fires.

BRIEF SUMMARY OF THE INVENTION

Various embodiments relate to the use of a combination of both (i) polytetrafluoroethylene and (ii) carbon filled polytetrafluoroethylene substrates, when applied to surfaces of a calibrator for making polyetherimide foams. These embodiments can provide a highly useful combination of (i) lubricity and (ii) static dissipation. The combination of both properties is essential to make foam because the lubricity enables the product to form without being damaged and the static dissipation prevents the occurrence of fires.

Various embodiments relate to a calibrator comprising a first plate opposed to a second plate, the first plate having a first foam-expansion surface adjacent to a first anti-static surface, wherein the first foam-expansion surface comprises a fluoropolymer, and wherein the first anti-static surface comprises a carbon-filled fluoropolymer. The calibrator can further comprise a first end proximal to a foam extrusion die and a second end distal to the foam extrusion die, wherein the foam-expansion region is positioned at the first end, and wherein the anti-static region is positioned at the second end.

Other embodiments relate to methods of producing a polyetherimide foam., the method comprising passing a liquid polymer mixture comprising a polyetherimide through a foam extrusion die into a calibrator comprising a first plate opposing a second plate, the first plate having a first foam-expansion surface adjacent to a first anti-static surface, the second plate having a second foam-expansion surface adjacent to a second anti-static surface, wherein the first foam-expansion surface and the second foam-expansion surface are aligned to form a foam-expansion region.

BRIEF DESCRIPTION OF THE DRAWINGS

These and other features, aspects, and advantages of the present invention will become better understood with reference to the following description and appended claims, and accompanying drawings where:

Figure 1:
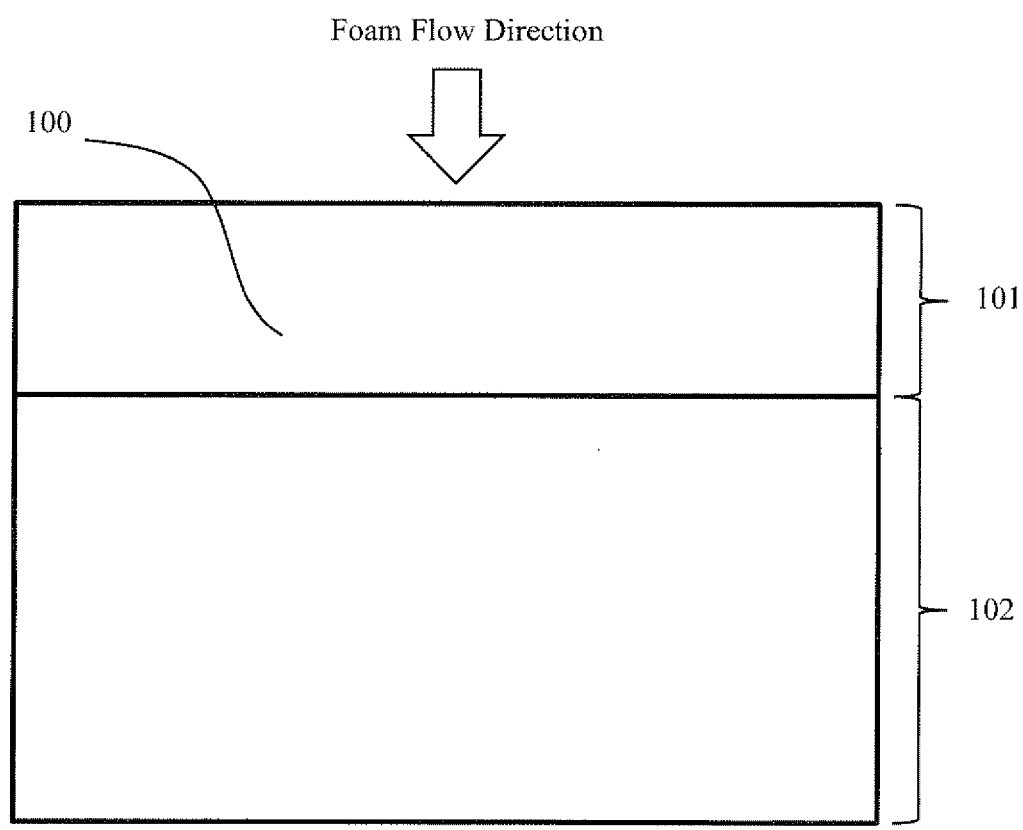
FIG. 1 shows a schematic top view of one plate of a calibrator according to various embodiments.

It should be understood that the various embodiments are not limited to the arrangements and instrumentality shown in the drawings.

DETAILED DESCRIPTION OF THE INVENTION

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result).

As described above, static accumulation during calibration of extruded thermoplastic foam board is common, and the discharge of this static can often lead to localized fires, particularly when using flammable blowing agents to expand the foam. Combustion of the blowing agent is a significant process upset and is also undesirable from many safety and operational perspectives.

Through extensive experimentation, it has been discovered that the static is generated between the polymeric foam and the calibration surface, where a highly lubricious material is often required to maximize the expansion of the foam. Teflon (PTFE) can be used due to its very low coefficient of friction, but this material is an electrical insulator, preventing dissipation of the static charge.

It has also been discovered that space around the foam is limited by the calibrator and by the Teflon, so efforts to dilute the blowing agent concentration in the area are also difficult.

Carbon-filled Teflon is available, which has significantly greater dissipative performance, but the coefficient of friction is 2-3 times that of unfilled material, which can limit the expansion of the foam, particularly when foaming high-temperature thermoplastics, which expand and solidify over a short distance.

Equipment can be provided with virgin Teflon for calibration and low-volume vent hoods. It has been discovered that fire occurrence is dependent upon resin system, blowing agents, and processing conditions.

According to various embodiments, a hybrid system consisting of a carbon-filled, anti-static PTFE Teflon and a thin, unfilled PTFE has been shown to meet target expansion levels in foam extrusion calibration systems while providing reduction in static levels, which reduces localized static discharge and resultant fires.

This hybrid calibration system is configured so that a thin piece of virgin Teflon is mounted in such a way that the expanding foam contacts the virgin Teflon for approximately 1 foot before it moves into direct contact with the anti-stat material. The virgin Teflon has a very high lubricity, allowing maximum expansion of the foam in the short distance required for high-temperature foams. The static charge does not accumulate to a level capable of discharging until later in the calibrator.

After struggling with fire occurrence during development trials for two years, static-dissipative Teflon was selected as a possible solution. The material itself was evaluated, and preliminary measurements indicate that static load was reduced from 6-10 kV to less than 2 kV at various points along the calibrator. This was an encouraging improvement, but in both trials the foam expansion was reduced by 10-15% based on width measurements, which is a significant process and product limitation. After struggling with other process variables to compensate for the limited width, a short strip of thin (0.010") virgin Teflon was placed between the antistat Teflon and the foam on the top and bottom of the calibrator, extending approximately 12" into the calibrator. Initial results indicate a return to full board width with a 70% reduction in static charge in the calibrator.

Various embodiments relate to a calibrator comprising a first plate opposed to a second plate, the first plate having a first foam-expansion surface adjacent to a first anti-static surface, wherein the first foam-expansion surface comprises a fluoropolymer, and wherein the first anti-static surface comprises a carbon-filled fluoropolymer. The fluoropolymer can be polytetrafluoroethylene. The carbon-filled fluoropolymer can be a carbon-filled polytetrafluoroethylene. The calibrator can further comprise a first end proximal to a foam extrusion die and a second end distal to the foam extrusion die, wherein the foam-expansion region is positioned at the first end, and wherein the anti-static region is positioned at the second end.

The anti-static region can impart a static dissipation factor of at least 0.003 to a polymer mixture in contact with the first plate and the second plate. The polymer mixture can be a liquid polymer mixture and can comprise a polyetherimide resin.

The foam-expansion region can impart a friction coefficient of 0.05 or lower to a polymer mixture in contact with the first plate and the second plate. The polymer mixture can comprises a polyetherimide resin. The foam-expansion region can have a length extending from the first end toward the second end, the length within a range of from 0.5 inches to 36 inches. The foam-expansion region can have a length extending from the first end toward the second end, the length being calibrated to allow a liquid polymer mixture ejected from the foam extrusion die to expand in volume by at least 500%

The second plate can have a second foam-expansion surface adjacent to a second anti-static surface, wherein the second foam-expansion surface comprises fluoropolymer, and wherein the second anti-static surface comprises carbon-filled carbon-filled fluoropolymer. The first foam-expansion surface and the second foam-expansion surface can be aligned to form a foam-expansion region, and the first anti-static surface and the second anti-static surface can be aligned to form an anti-static region.

Another embodiments relates to a calibrator comprising a first plate opposing a second plate, the first plate having a first foam-expansion surface adjacent to a first anti-static surface, the second plate having a second foam-expansion surface adjacent to a second anti-static surface, wherein the first foam-expansion surface and the second foam-expansion surface are aligned to form a foam-expansion region, and wherein the first anti-static surface and the second anti-static surface are aligned to form an anti-static region. The foam-expansion region can comprises an amount of polytetrafluoroethylene sufficient to impart a friction coefficient of 0.05 or lower to a polymer mixture in contact with the first plate and the second plate. The anti-static region can comprise an amount of carbon-filled polytetrafluoroethylene sufficient to impart a static dissipation coefficient of at least 0.003 to a polymer mixture in contact with the first plate and the second plate.

The calibrator can further comprise a first end proximal to a foam extrusion die and a second end distal to the foam extrusion die, wherein the foam-expansion region is positioned at the first end, wherein the anti-static region is positioned at the second end, and wherein the foam-expansion region has a length extending from the first end toward the second end, the length being calibrated to allow a polymer mixture ejected from the foam extrusion die to expand in volume by at least 500%.

Another embodiment relates to a method of producing a polyetherimide foam, the method comprising passing a liquid polymer mixture comprising a polyetherimide through a foam extrusion die into a calibrator comprising a first plate opposing a second plate, the first plate having a first foam-expansion surface adjacent to a first anti-static surface, the second plate having a second foam-expansion surface adjacent to a second anti-static surface, wherein the first foam-expansion surface and the second foam-expansion surface are aligned to form a foam-expansion region. The first anti-static surface and the second anti-static surface can be aligned to form an anti-static region. The foam-expansion region can comprise an amount of fluoropolymer sufficient to impart a friction coefficient of 0.05 or lower to a polymer mixture in contact with the first plate and the second plate. The fluoropolymer can be polytetrafluoroethylene. The fluoropolymer can be carbon-filled polytetrafluoroethylene.

The anti-static region can comprise an amount of carbon-filled fluoropolymer sufficient to impart a static dissipation coefficient of at least 0.003 to a polymer mixture in contact with the first plate and the second plate. The method can further comprise extruding polyetherimide, a nucleant, and one or more blowing agents through a first extruder to create a preliminary mixture, passing the preliminary mixture through a second extruder to create the polymer mixture, and/or pulling the polyetherimide foam through the calibrator with a puller.

The operating conditions at which the foam can be made varies, depending on factors such as product requirements, equipment available, and the like. In the first extruder, for instance, the temperature of the first extruder can operate, for instance, ranges to 300 to 400. The pressure at which the first extruder can operate can range from 5 to 120 bar. The speed of the first extruder can also vary, e.g., from 75 to 150 rpm. The type of first extruders can vary, e.g., 64 mm twin extruder. In the second extruder, the temperature of the second extruder can operate, for instance, ranges to 150 to 225 C. The pressure at which the second extruder can operate can range from 5 to 120 bar. The speed of the second extruder can also vary, e.g., from 5 to 25 rpm. The type of second extruders can also vary, e.g., 150 mm single extruders. Dies that are suitable include any die, which when used in accordance, to the invention, enables the use of a our calibrator. Routine experimentation can determine optimal parameters for a specific product.

The calibrator can further comprise a first end proximal to a foam extrusion die and a second end distal to the foam extrusion die, wherein the foam-expansion region is positioned at the first end, wherein the anti-static region is positioned at the second end, and wherein the foam-expansion region has a length extending from the first end toward the second end, the length being calibrated to allow a polymer mixture ejected from the foam extrusion die to expand in volume by at least 500%.

EXAMPLES

Examples 1-3

The purpose of Examples 1-3 is to compare the performance of an inventive calibrator with other calibrators during a foam manufacturing process. These examples demonstrate that the inventive calibrator achieves superior results. More specifically, the invention calibrator eliminated static dissipation charges more effectively than other calibrators. Additionally, the inventive calibrator imparted sufficient lubricity to foam surfaces to allow the width of foam to be retained during the manufacturing process.

The inventive calibrator, according to Example 1, included a first plate opposed to a second plate. The first plate had a first foam-expansion surface adjacent to a first anti-static surface. The first foam-expansion surface comprised a fluoropolymer. The first anti-static surface comprised a carbon-filled fluoropolymer. The inventive calibrator was compared to calibrators, as described in Examples 2 and 3, lacking the inventive combination of a first foam-expansion surface comprising a fluoropolymer and a first anti-static surface comprising a carbon-filled fluoropolymer.

Table 1 lists materials employed in Examples 1-3.

TABLE 1

| Material | Description | Gage | Source |
| --- | --- | --- | --- |
| Teflon (PTFE) | Unfilled (virgin) filler | 0.010" 0.25 mm | Tex-o-lon, Inc. |
| Teflon (PTFE) | 25% Carbonfiller | 0.060" (1.5 mm) | Dalau, Ltd. |
| ULTEM ® Foam | polyetherimide foam | 25 mm to 40 mm | SABIC Innovative Plastics US LLC |

Techniques/Procedures
Polyetherimide Foam Manufacturing Process

A polyetherimide foam was made in accordance to the process described below in the examples. Baseline experiments were conducted to measure maximum load on the edge of a foam board as it passed through the parallel-plate calibrator, checking at multiple locations over the course of approximately 8 hours of run time.

Technique for Determining Static Charge/Board Width Measurements

The polyetherimide foam was run at a rate of 150-200 kg/hr at line speeds between 0.65 and 0.85 m/min. Static charge was measured at locations on the side of the calibrator with a Digital Stat Arc 2 meter from Monroe Electronics. Board width measurements were also observed, which is a critical manufacturing component for foam extrusion.

Example 1 (Invention)

The purpose of this example is to show how virgin and anti-static PTFE films can be used in combination to provide static dissipation adequate to prevent static accumulation with sufficient localized lubricity to meet the expansion requirements of the foam product.

Polyetherimide foam was made by passing a liquid polymer mixture comprising a polyetherimide through a foam extrusion die into a calibrator comprising a first plate opposing a second plate.

The first plate had a first foam-expansion surface adjacent to a first anti-static surface. The second plate had a second foam-expansion surface adjacent to a second anti-static surface, such that the first foam-expansion surface and the second foam-expansion surface were aligned to form a foam-expansion region, and where the first anti-static surface and the second anti-static surface were aligned to form an anti-static region. The foam-expansion region comprised an amount of fluoropolymer sufficient to impart a friction coefficient of 0.05 or lower to a polymer mixture in contact with the first plate and the second plate, and such that the anti-static region comprised an amount of carbon-filled fluoropolymer sufficient to impart a static dissipation coefficient of at least 0.003 to a polymer mixture in contact with the first plate and the second plate. The amount of amount of fluoropolymer in the foam-expansion region and/or the amount of carbon-filled fluoropolymer in the anti-static region can vary, depending on the application. In one embodiment, the foam-expansion region can range from 450 to 600 mm$^2$, and fluoropolymer can encompass this region of ranging 450 to 600 mm$^2$. In one embodiment, the anti-static region ranges from 1200 to 1400 mm$^2$ and, as such, the carbon-filled fluoropolymer can range from 1200 to 1400 mm$^2$.

Figure 2:
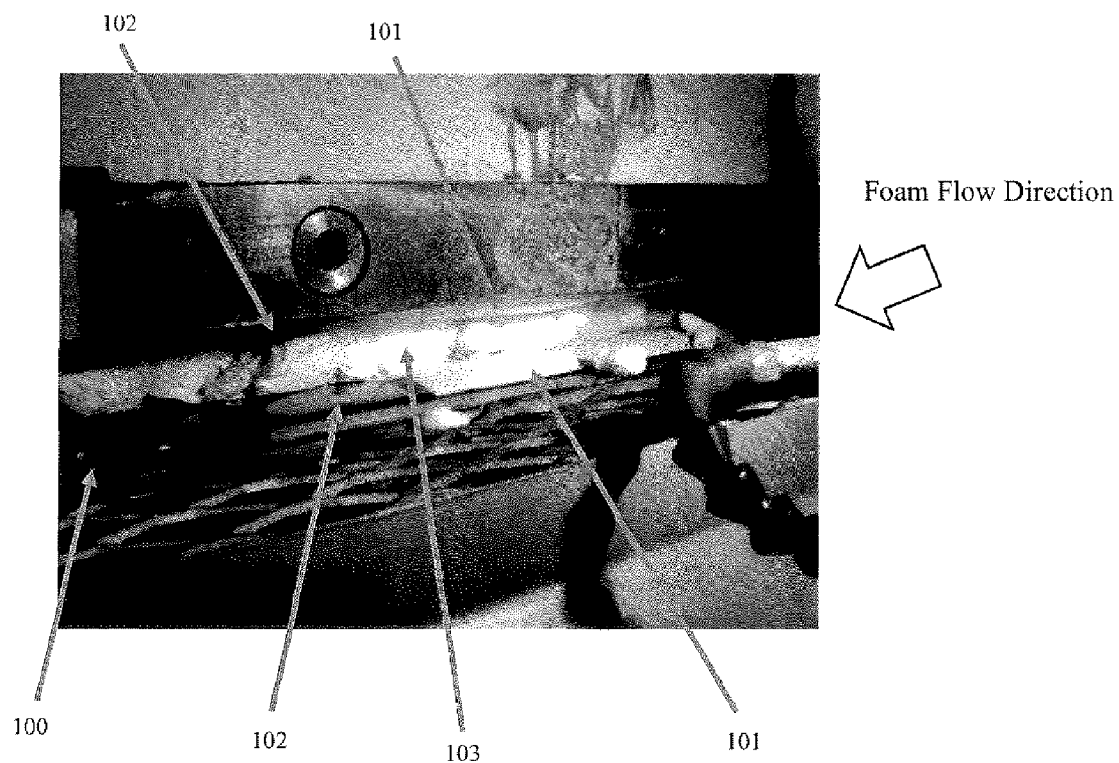
FIG. 2 shows a photograph of a side of a calibrator according to various embodiments.
Figure 3:
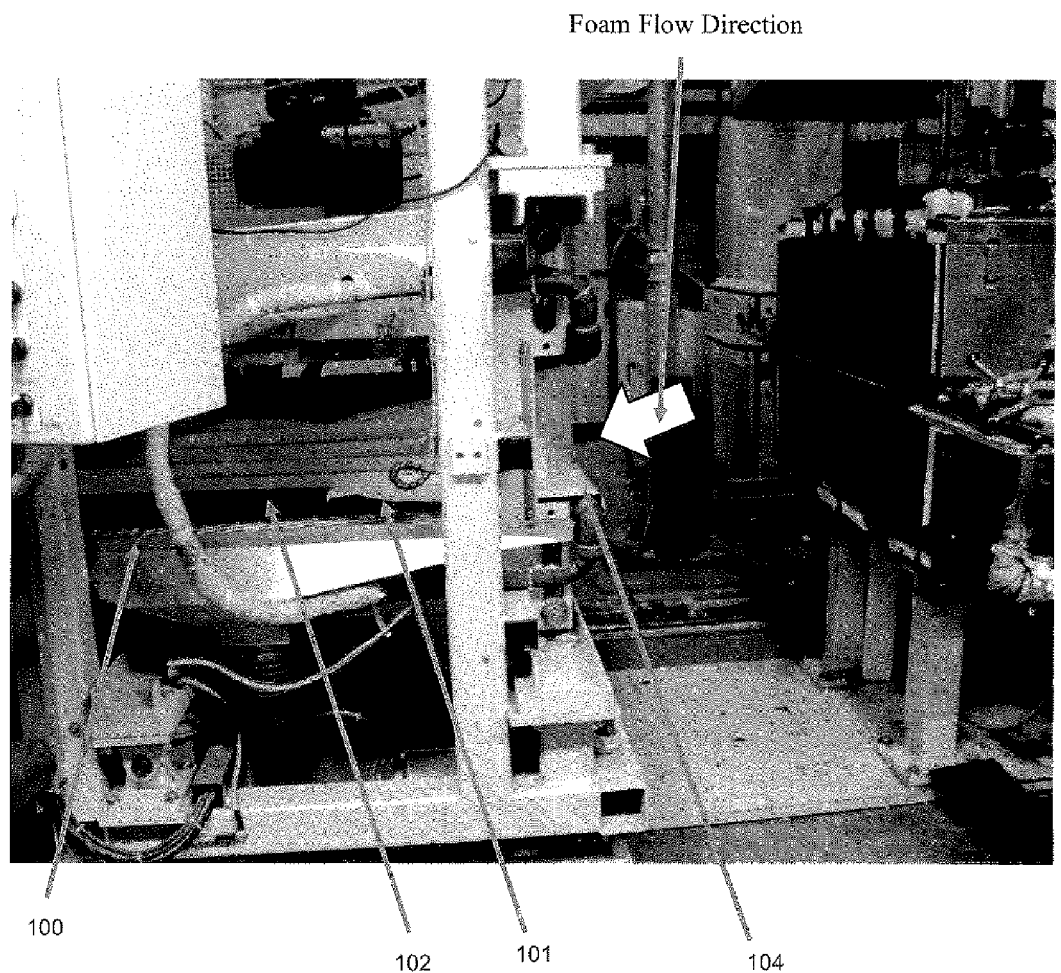
FIG. 3 shows a photograph of a side of a calibrator according to various embodiments.

As shown in FIGS. 1-3, the calibrator 100 according to inventive example 1, included a foam expansion region 101, comprising a short piece of thin, virgin TEFLON®, polytetrafluoroethylene (PTFE), i.e., a fluoropolymer. At the entrance to the calibrator, the foam expansion region 101 was placed on top of an anti-static surface 102, comprising, anti-static PTFE. The foam expansion region 101, comprising the virgin material, was sized to cover the area where most of the expansion occurs, which was roughly the first 12-18 inches of the 50 inch calibrator length. Most of the static load occurred in the area after the width expansion, as the foam 103 surface cooled and the core expansion increased pressure of the foam against the calibrator surface. Maintaining the anti-static Teflon in this area dissipated the load much faster than virgin PTFE.

As shown in FIG. 2, a corresponding foam expansion region 101 and a corresponding anti-static surface 102 can be positioned on the opposing surface of the inventive calibrator.

FIGS. 1-3 also illustrate the foam flow direction across the foam expansion regions 101 and the anti-static surfaces 102 from the foam extrusion die 104.

The combined-media approach, according to inventive example 1, wherein the foam expansion region(s) and the anti-static surface(s) comprise different materials proved to be highly successful, with nearly full realization of both static load reduction and board width expansion. Over 10 runs were completed with no incidents of fire.

Figure 4:
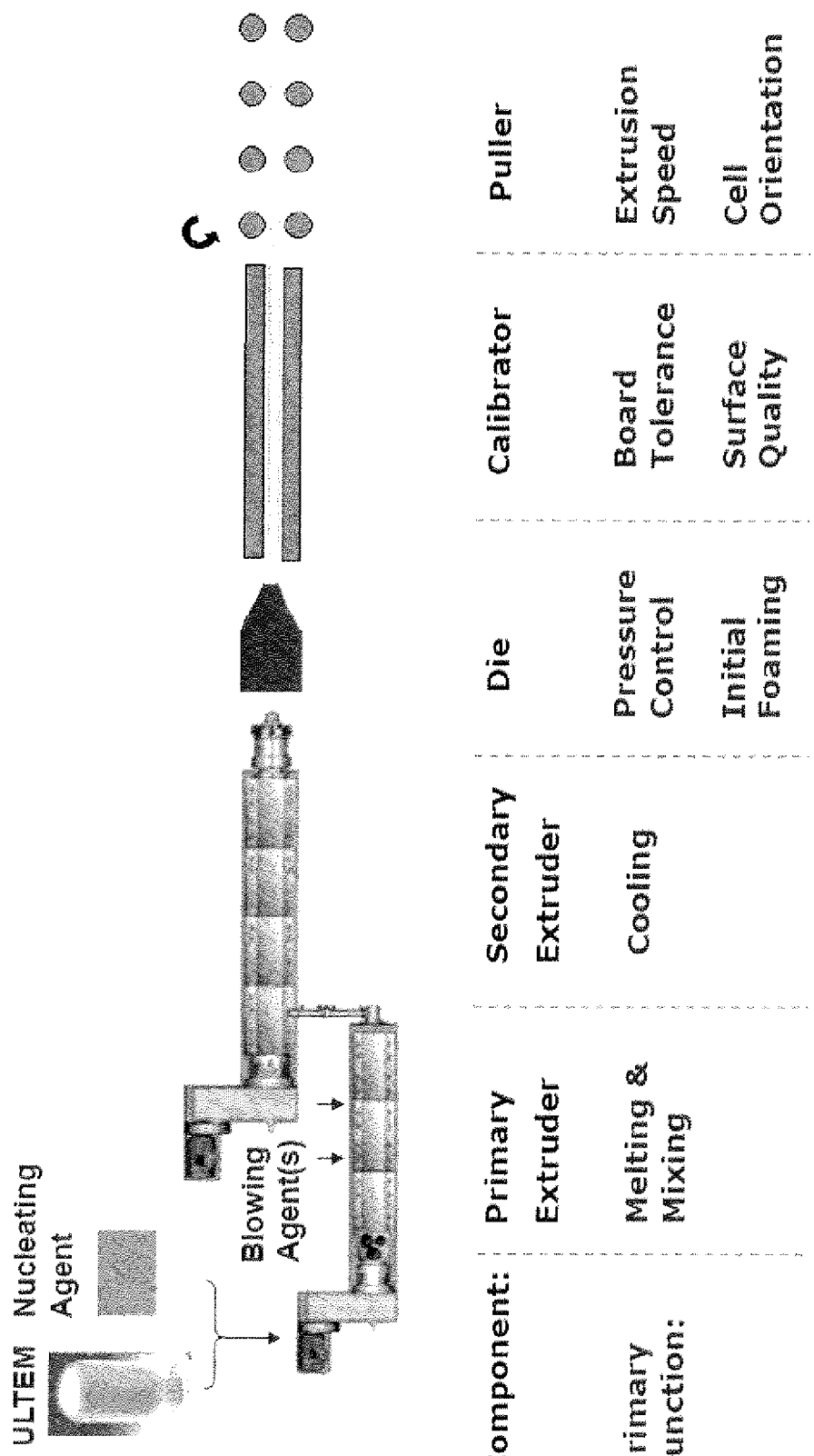
FIG. 4 is a schematic diagram of a foam extrusion process, including a calibrator according to various embodiments.
Figure 5:
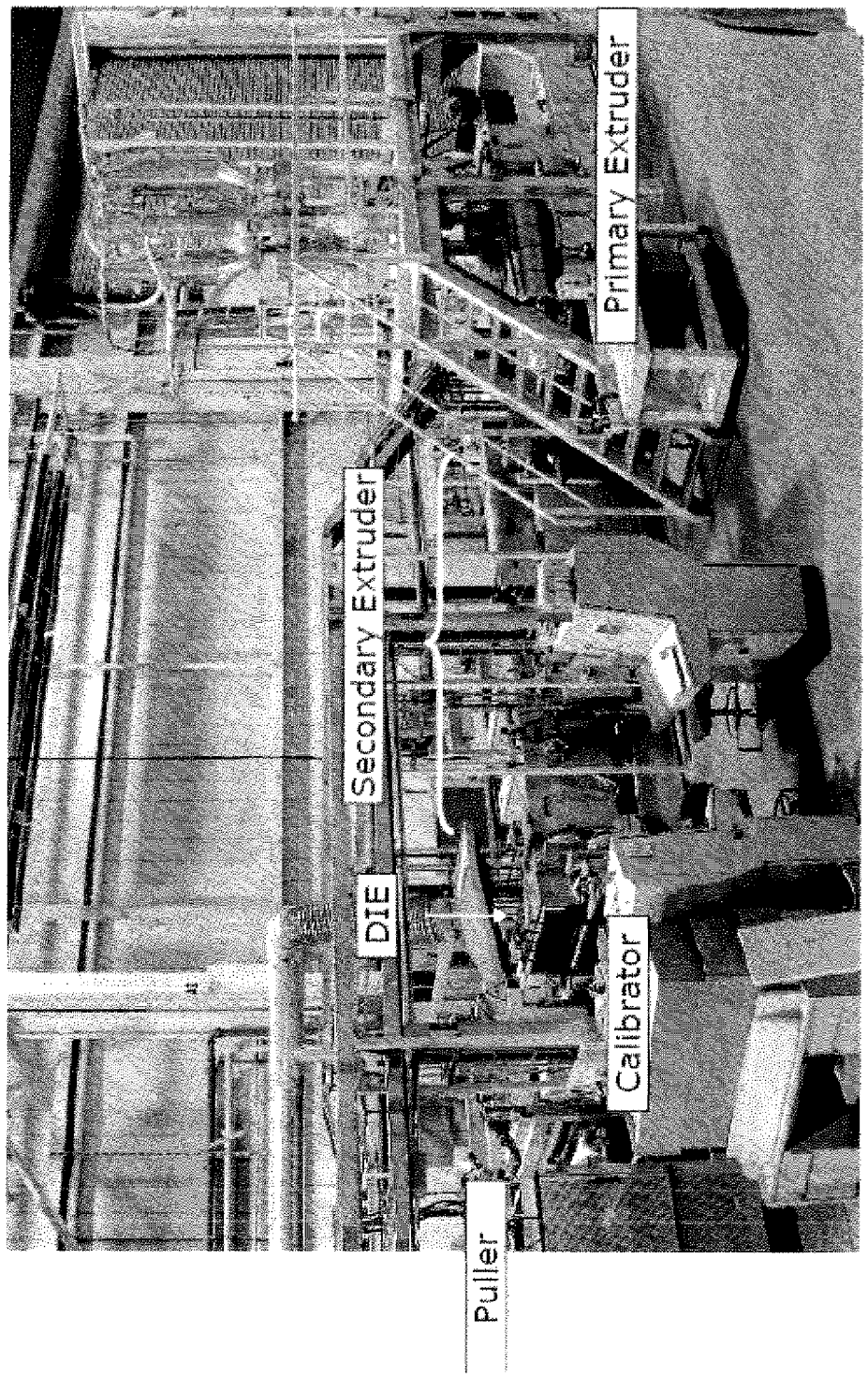
FIG. 5 is a photograph of a foam extrusion process according to various embodiments.
Figure 6:
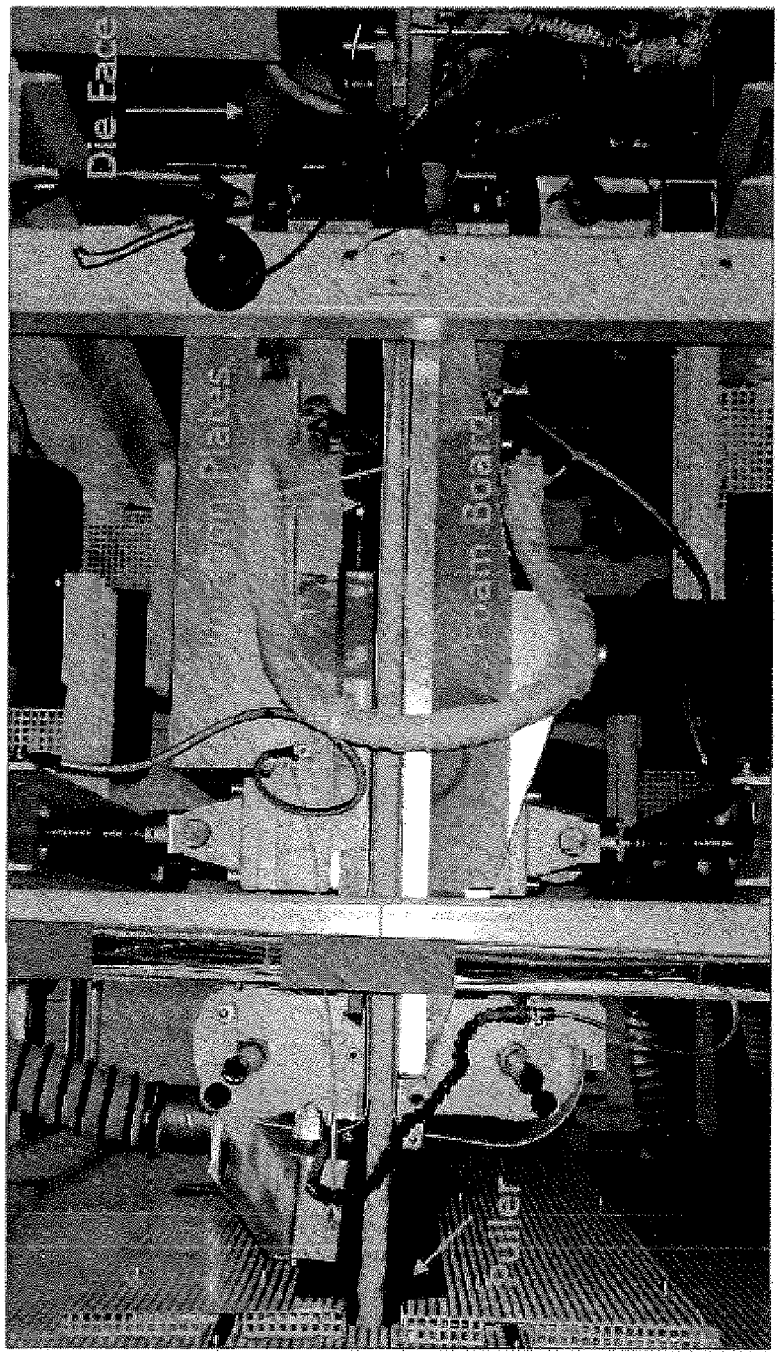
FIG. 6 is a photograph of a foam extrusion process according to various embodiments.

FIGS. 4-6 provide additional details of the foam extrusion process.

Figure 7:
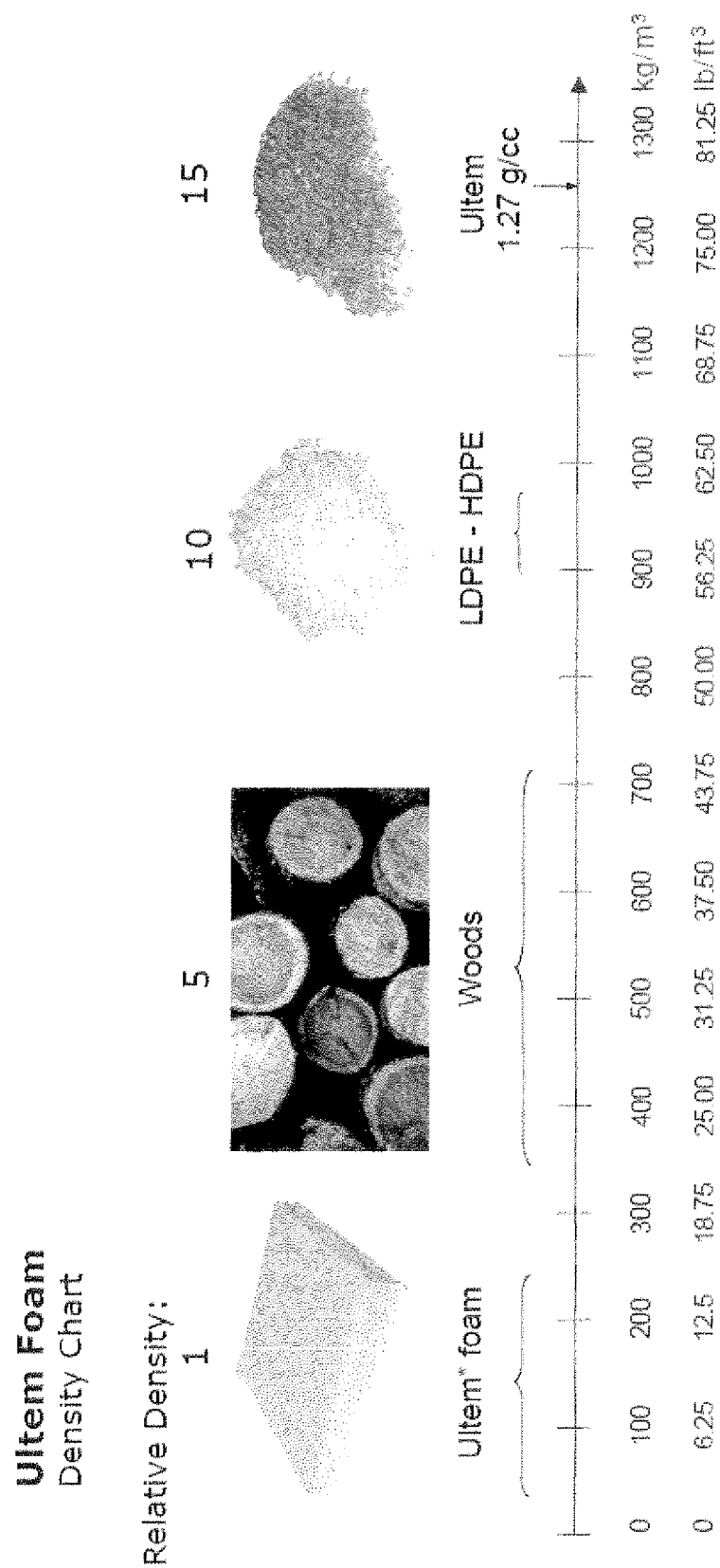
FIG. 7 is a chart showing the relative density of polyetherimide foam (UTLEM® foam) compared to other materials.

FIG. 7 provides a compares the density of ULTEM® polyetherimide foams with other materials. As shown in FIG. 7, polyetherimide foams can have a density of 60, 80, or 110 kg/m$^3$. The foams can be produced in sheets of various sizes. For examples, the foams can be produced in 4 foot by 8 foot sheets. The polyetherimide foams can be 10 to 20 times lighter than polyetherimide ULTEM® polyetherimide can provide best in class Fire Safety and Toxicity (FST) properties. Generally, ULTEM® resin is an amorphous, transparent, amber, polyetherimide plastic offering outstanding high heat resistance, high strength, modulus, and broad chemical resistance. ULTEM® resin can offer inherent flame resistance, even without flame retardant additives, low smoke and toxicity, low heat release rate, hydrolytic and chemical stability, long-term heat resistance, and a high Limiting Oxygen Index (LOI) of about 44. ULTEM® resin can be used in films, sheets, foams, and injection molding applications.

Example 2 (Comparative)

The purpose of this comparative example was to demonstrate that a calibrator lined only with a virgin, unfilled, PTFE can provide adequate lubricity for foam expansion, but has electrically-insulative properties that contribute to the accumulation of significant levels of static charge, which eventually discharge, creating an ignition source.

During continuous foam extrusion, static charge was generated between the expanding thermoplastic foam and the calibration surface. The calibrator was lined with virgin, unfilled PTFE to minimize drag as the foam was pulled through the calibrator and expanded across the calibrator width. This charge was measured at over 18 kV, and was observed to discharge at loadings as low as 6 kV. As the discharge was in the vicinity of the foam blowing agents, which are often flammable, this can readily result in fires. Over 8 runs, the average rate of fire occurrence was every five runs or more.

Example 3 (Comparative)

The purpose of this comparative example is to demonstrate that a calibrator lined only with materials with conductivity sufficient to dissipate static charge and to reduce the risk of static discharges fail to provide adequate lubricity to allow the foam to expand to the required dimensions.

The results shown in Table 2, reveal that maximum static loads were significantly reduced through the use of the carbon-filled Teflon media, but the increased friction of the material resulted in a reduction in the width of the foam board, which is an unacceptable result, as width retention of the board is a critical manufacturing specification.

TABLE 2

| Example | Calibration Material | Static Load, max (kV) | Visible Discharge | Max. Board Width, in. |
|---|---|---|---|---|
| 1 | Teflon, 2 ft of virgin, followed by 25% carbon | 2.5 | No | 58 |
| 2 | Teflon, virgin | 6.4 | Yes | 58 |
| 3 | Teflon, 20% carbon | 2.3 | No | 53 |

Discussion of Examples 1-3

According to various inventive embodiments, including the embodiment shown in Example 1, it has been unexpectedly discovered that a calibrator can achieve both anti-static and high lubricity properties.

Examples 4-6 (Additional Comparative Examples)

In an effort to utilize the high-lubricity, virgin PTFE, required to meet the expansion requirements of the foam, a number of anti-static measures were attempted.

Example 4 (Comparative)

In one experiment, antistatic brushes were placed at the exit of the calibration area, which were successful in reducing the static load in this location, but did not address static buildup along the sides of the calibration area. Static measurements in these areas continued to exceed 6 kV, with static discharges observed.

Example 5 (Comparative)

In another experiment, anti-static air nozzles were mounted to the sides of the calibrator, with the objective of reducing the static load. No measureable amount of reduction was observed through the use of the anti-static air nozzles. Based on literature supplied with the air nozzles, effectiveness is reduced in enclosed spaces, which was likely a factor as the edges of the foam were in a 1.0-1.5" gap between the metal calibration plates, at a distance from the air nozzle that varied from 1 to 12 inches.

Example 6 (Comparative)

In another experiment, antistatic brushes were mounted to hinged, pressure arms in an effort to maintain contact with the edges of the foam board. The distance from the exterior of the metal calibration plates to the board changes in the range of 1 inch to 12 inches as the board changes width as a result of process or formulation changes. The brushes successfully reduced the static load while they were in contact with the board, but were not robust enough for the process; the roughness of the board edges and the frequent changes in board width resulted in rapid misalignment and destruction of the devices.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, sixth paragraph. In particular, the use of "step of" in the claims herein is not intended to invoke the provisions of 35 U.S.C. §112, sixth paragraph.

What is claimed is:
1. A calibrator comprising a first plate opposed to a second plate, the first plate comprising:
 a first foam-expansion surface adjacent to
 a first anti-static surface,
 wherein the first foam-expansion surface comprises an unfilled fluoropolymer,
 wherein the first anti-static surface comprises a carbon-filled fluoropolymer,
 wherein the calibrator further comprises a first end proximal to a foam extrusion die and a second end distal to the foam extrusion die, wherein the first foam expan- sion surface is positioned at the first end and the first anti-static surface is positioned at the second end.

2. The calibrator according to claim 1, the second plate comprising:
a second foam-expansion surface adjacent to
a second anti-static surface,
wherein the second foam-expansion surface comprises an unfilled fluoropolymer, and
wherein the second anti-static surface comprises a carbon-filled fluoropolymer.

3. The calibrator according to claim 2,
wherein the first foam-expansion surface and the second foam-expansion surface are aligned to form a foam-expansion region, and
wherein the first anti-static surface and the second anti-static surface are aligned to form an anti-static region.

4. The calibrator according to claim 3, wherein the foam-expansion region imparts a friction coefficient of 0.05 or lower to a polymer mixture in contact with the first plate and the second plate.

5. The calibrator according to claim 4, wherein a polymer mixture comprises a polyetherimide resin.

6. The calibrator according to claim 3, wherein the anti-static region imparts a static dissipation factor oat least 0.003 to a polymer mixture in contact with the first plate and the second plate.

7. The calibrator according to claim 6, wherein a polymer mixture comprises a polyetherimide resin.

8. The calibrator according to claim 3,
wherein a foam-expansion region is positioned at the first end, and
wherein an anti-static region is positioned at the second end.

9. The calibrator according to claim 8, wherein the foam-expansion region has a length extending from the first end toward the second end, the length within a range of from 0.5 inches to 36 inches.

10. The calibrator according to claim 8, wherein the foam-expansion region has a length extending from the first end toward the second end, the length being calibrated to allow a liquid polymer mixture to be ejected from the foam extrusion die to expand in a volume by at least 500%.

11. The calibrator plate according to claim 1, wherein the unfilled fluoropolymer is polytetrafluoroethylene.

12. The calibrator plate according to claim 1, wherein the carbon-filled fluoropolymer is carbon-filled polytetrafluoroethylene.

13. A calibrator comprising a first plate opposing a second plate,
the first plate comprising
a first foam-expansion surface adjacent to
a first anti-static surface,
the second plate having
a second foam-expansion surface adjacent to
a second anti-static surface,
wherein the first foam-expansion surface comprises an unfilled fluoropolymer,
wherein the first anti-static surface comprises a carbon-filled fluoropolymer
wherein the first foam-expansion surface and the second foam-expansion surface are aligned to form a foam-expansion region,
wherein the first anti-static surface and the second anti-static surface are aligned to form an anti-static region, and
wherein the calibrator comprises a first end proximal to a foam extrusion die and a second end distal to the foam extrusion die,
wherein the foam-expansion region is positioned at the first end,
wherein the anti-static region is positioned at the second end.

14. The calibrator according to claim 13, wherein the foam-expansion region comprises an amount of polytetrafluoroethylene sufficient to impart a friction coefficient of 0.05 or lower to a polymer mixture in contact with the first plate and the second plate.

15. The calibrator according to claim 13, wherein the anti-static region comprises an amount of carbon-filled polytetrafluoroethylene sufficient to impart a static dissipation coefficient of at least 0.003 to a polymer mixture in contact with the first plate and the second plate.

16. The calibrator according to claim 13,
wherein the foam-expansion region has a length extending from the first end toward the second end, the length being calibrated to allow a polymer mixture to be ejected from the foam extrusion die to expand in a volume by at least 500%.

* * * * *